K. J. THORSBY.
PIPE EXPANDER.
APPLICATION FILED JAN. 24, 1914.

1,132,807.

Patented Mar. 23, 1915.
2 SHEETS—SHEET 1.

WITNESSES:
H. A. Stock
S. Constine.

INVENTOR
Karl Johan Thorsby
BY Wm. F. Booth
ATTORNEY

K. J. THORSBY.
PIPE EXPANDER.
APPLICATION FILED JAN. 24, 1914.
1,132,807.
Patented Mar. 23, 1915.
2 SHEETS—SHEET 2.
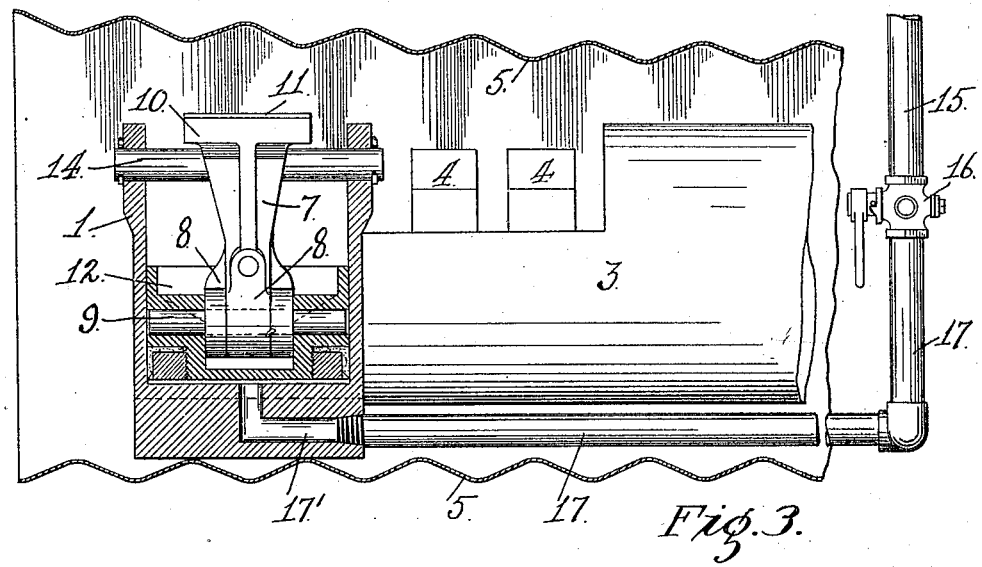
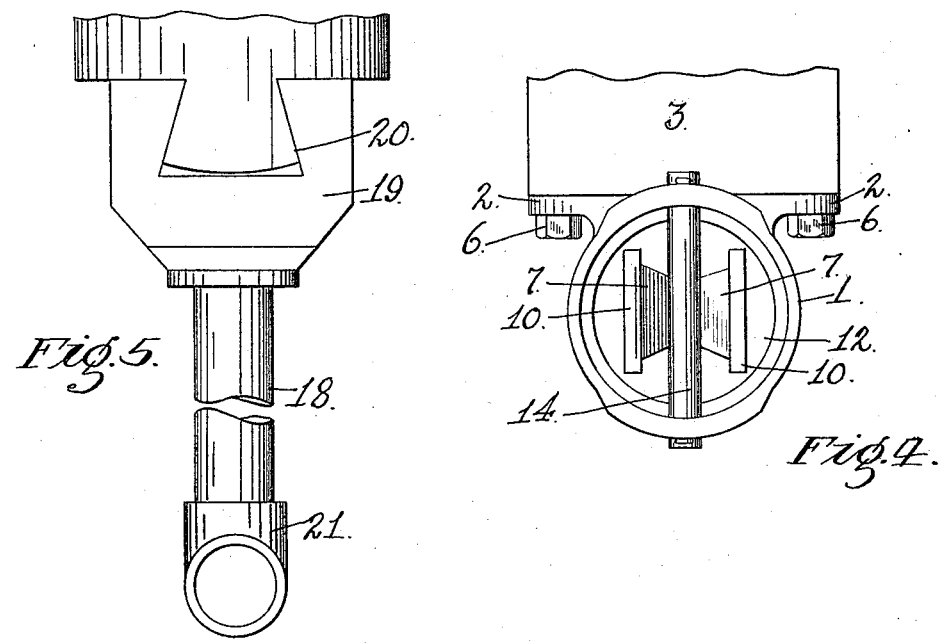
WITNESSES:
H. A. Stock.
S. Constines.
INVENTOR
Karl Johan Thorsby
BY Wm. F. Booth
ATTORNEY

UNITED STATES PATENT OFFICE.

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

PIPE-EXPANDER.

1,132,807.  Specification of Letters Patent.  Patented Mar. 23, 1915.

Application filed January 24, 1914. Serial No. 814,094.

*To all whom it may concern:*

Be it known that I, KARL JOHAN THORSBY, a subject of the King of Norway, residing at Oakland, in the county of Alameda and State of California, have invented certain new and useful Improvements in Pipe-Expanders, of which the following is a specification.

My invention relates to pipe-expanders. It is particularly adapted for use in connection with the manufacture of corrugated culvert pipes, or pipes of comparatively small diameter and heavy plates.

In the manufacture of corrugated culvert pipe, it is customary to construct the pipe from a plurality of sections which overlap or telescope their adjacent ends. An end of each section must, therefore, in order to admit of this overlap, be expanded or opened up sufficiently to slip over the end of the adjacent section. This operation takes considerable time and labor, especially when done by hand, which is the general method. By my invention this objection is overcome, and the necessary expansion is effected without loss of time and with a minimum of labor.

This is the object of my invention, and to this end my invention consists in a novel pipe-expander as I shall hereinafter fully describe by reference to the accompanying drawings, it being understood that only the best form of the device is herein illustrated and that many changes and variations are possible without departing from the scope of the appended claims.

Figure 1:
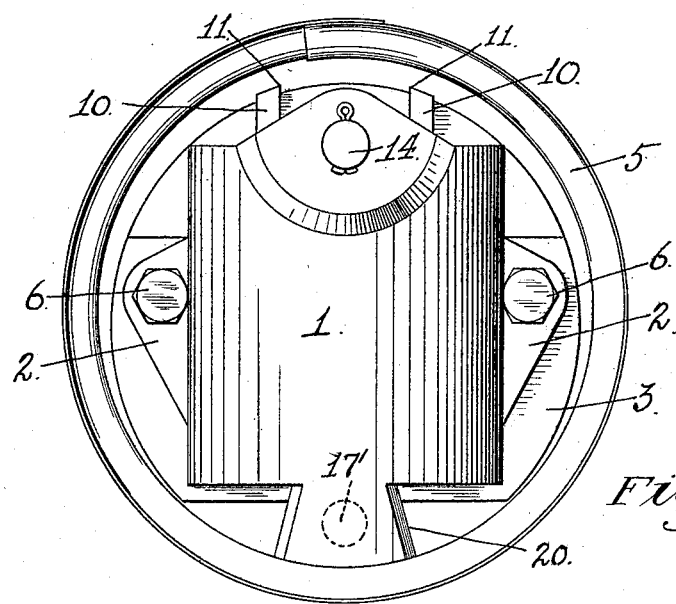
Figure 2:
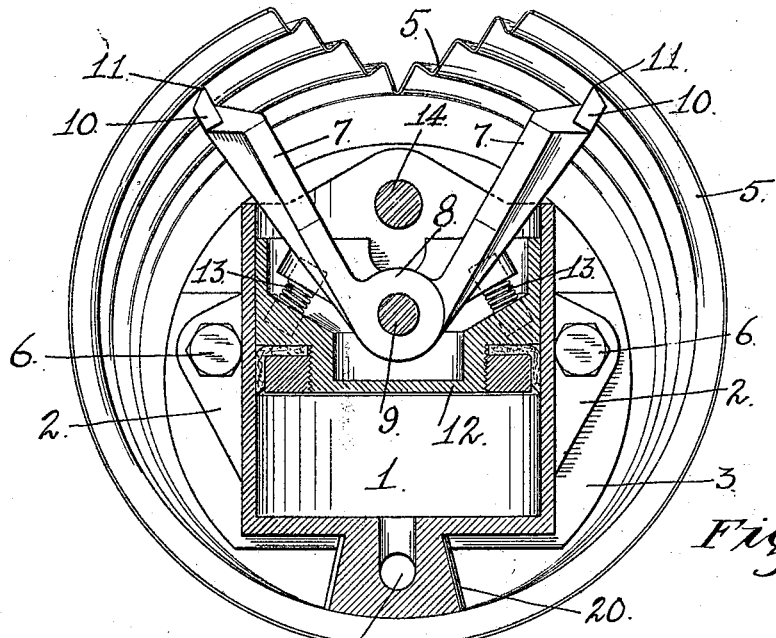

In the drawings Figure 1 is an elevation of my pipe expander showing it in place in the pipe and ready for operation. Fig. 2 is a vertical section of the expander showing the expansion arms in elevation and projected to expand the pipe. Fig. 3 is a vertical section at right-angles to Fig. 2, showing the expander and the means for fixing it in place in the pipe. Fig. 4 is a top view of the expander. Fig. 5 is a fragmentary view of the expander showing the application thereto of a distance-piece.

The expander comprises, in general, a frame, means for positioning the frame in the pipe, expansion-members carried by the frame, and means for operating said members. In particular, and in the best form, these essential parts of the device are as follows:—

1 is the frame, which in this instance is a cylinder provided with side ears 2.

3 is what is known as an ordinary stake-riveter, which is a stock having members 4 which are used to manufacture the pipe 5. To this stake-riveter the cylinder 1 is fixed by the lag-bolts 6 in the cylinder ears.

7 are the expansion-members. These are arms, each having at its inner end a circular bearing 8 pivoted upon a pintle 9, which lies within the cylinder and has a movement therein parallel with its axis. The outer end of each of the arms is provided with a head 10 having a sharp edge 11 in order to prevent it from slipping when forced against the pipe 5. Within the cylinder 1 is a piston 12, in which is carried the pintle 9. Springs 13 are connected to the piston and to the arms, to bring the arms back again from their divergent angle, which they assume when expanding the pipe. Secured to the end of the cylinder 1 and crossing it between the arms is a bar 14, which not only prevents the piston from being forced out of the cylinder, but also acts as a guide for the arms 7, in such a way as to prevent said piston from twisting, thus keeping both piston and arms in the desired position.

15 is a pipe leading from a source of fluid pressure, say steam or water, or, preferably, air.

16 is a valve to control the admission and exhaust of the fluid, and 17 is a pipe which leads the fluid to the port 17' in the cylinder below the piston. In cases where the diameters of the pipes vary, a distance piece 18 is used. This consists of a turnable screw post or column having a head 19 fitted to a dovetail 20 on the base of the cylinder and provided with a foot 21 to rest in the pipe.

The operation is as follows: When the valve 16 is opened, the pressure fluid enters the bottom of the cylinder through the pipe 17, and forces the piston outward. This movement of the piston carries the arms 7 outward, until their heads 10 contact with the pipe 5. Further movement causes the heads to grip the pipe and to force or expand its walls out to greater diameter, the arms 7 diverging as they turn about their pintle 9. But as a certain resistance is offered by the pipe, said pipe will, under the pressure of the arms 7, expand uniformly in circular shape. When the expansion is completed, and the adjacent pipe section is slipped in, the valve 16 is turned to cut off the fluid pressure to the cylinder, at the same time opening the exhaust therefrom. The piston then falls back to its original position, and the springs 13, which on the outward movement had been condensed, will by their expansion bring back the arms 7 toward each other.

I claim:—

1. In a pipe-expander, the combination of a cylinder adapted to be fitted within the pipe; expansion-members movable in the cylinder; a piston in the cylinder coacting with the expansion members to force them against the pipe to expand it; and means for operating the piston.

2. In a pipe-expander, the combination of a cylinder adapted to be fitted within the pipe; expansion-members movable in the cylinder; means for fixing the cylinder in said pipe; a piston in the cylinder coacting with the expansion members to force them against the pipe to expand it; and means for operating the piston.

3. In a pipe-expander, the combination of a cylinder adapted to be fitted within the pipe; expansion members movable in the cylinder; a piston in the cylinder coacting with the expansion members to force them against the pipe to expand it; springs to return the expansion members when the pressure of the piston is relieved; and means for operating the piston.

4. In a pipe-expander, the combination of a cylinder adapted to be fitted within the pipe; means for fixing the cylinder in said pipe; expansion members movable in the cylinder; a piston in the cylinder coacting with the expansion members to force them against the pipe to expand it; springs to return the expansion members when the pressure of the piston is relieved; and means for operating the piston.

5. In a pipe-expander, the combination of a cylinder adapted to be fitted within the pipe; expansion-arms pivotally connected at their inner ends for divergence and approach, the pivotal connection of said arms being fitted in the cylinder and having a movement therein parallel with its axis; a piston in the cylinder coacting with the arms and adapted to move them outward to their engagement with the pipe; and means for operating the piston.

6. In a pipe-expander, the combination of a cylinder adapted to be fitted within the pipe; expansion-arms pivotally connected at their inner ends for divergence and approach, the pivotal connection of said arms being fitted in the cylinder and having a movement therein parallel with its axis; a piston in the cylinder coacting with the arms and adapted to move them outward to their engagement with the pipe; springs to return the arms when the pressure of the piston is relieved; and means for operating the piston.

7. In a pipe-expander, the combination of a cylinder adapted to be fitted within the pipe; expansion-arms pivotally connected at their inner ends for divergence and approach, the pivotal connection of said arms being fitted in the cylinder and having a movement therein parallel with its axis; a piston in the cylinder coacting with the arms and adapted to move them outward to their engagement with the pipe; and means for operating the piston, consisting of a fluid-pressure connection to the cylinder.

8. In a pipe-expander, the combination of a cylinder adapted to be fitted within the pipe; expansion-arms pivotally connected at their inner ends for divergence and approach, the pivotal connection of said arms being fitted in the cylinder and having a movement therein parallel with its axis; a piston in the cylinder coacting with the arms and adapted to move them outward to their engagement with the pipe; a cross bar secured to the end of the cylinder between the arms; and means for operating the piston.

9. In a pipe-expander, the combination of a cylinder adapted to be fitted within the pipe; expansion-arms pivotally connected at their inner ends for divergence and approach, the pivotal connection of said arms being fitted in the cylinder and having a movement therein parallel with its axis; a piston in the cylinder coacting with the arms and adapted to move them outward to their engagement with the pipe; springs to return the arms when the pressure of the piston is relieved; a cross bar secured to the end of the cylinder between the arms; and means for operating the piston.

10. In a pipe-expander, the combination of a frame adapted to be fitted within the cylinder; expansion-arms carried by the frame; means for forcing said arms to bear against the pipe to expand it; and an adjustable spacing piece fitted to the base of the frame to adapt it for different diameters of pipes.

In testimony whereof I have signed my name to this specification in the presence of two subscribing witnesses.

KARL JOHAN THORSBY.

Witnesses:
S. A. FORD,
C. R. HODGKIN.

Copies of this patent may be obtained for five cents each, by addressing the "Commissioner of Patents, Washington, D. C."